US012227397B2

(12) United States Patent
Tabutin et al.

(10) Patent No.: US 12,227,397 B2
(45) Date of Patent: Feb. 18, 2025

(54) HIGHLY VISIBLE COUNTERWEIGHTS FOR LIFTING MACHINES

(71) Applicant: Caterpillar Inc., Peoria, IL (US)

(72) Inventors: Simon Tabutin, Annecy (FR); Sean D. Lawson, East Peoria, IL (US)

(73) Assignee: Caterpillar Inc., Peoria, IL (US)

( * ) Notice: Subject to any disclaimer, the term of this patent is extended or adjusted under 35 U.S.C. 154(b) by 268 days.

(21) Appl. No.: 18/061,466

(22) Filed: Dec. 4, 2022

(65) Prior Publication Data

US 2024/0182273 A1 Jun. 6, 2024

(51) Int. Cl.
*B66C 23/00* (2006.01)
*B66C 23/76* (2006.01)

(52) U.S. Cl.
CPC .................................... *B66C 23/76* (2013.01)

(58) Field of Classification Search
CPC .......... B66C 23/76; B66C 23/74; B66C 23/88
See application file for complete search history.

(56) References Cited

U.S. PATENT DOCUMENTS

2017/0254682 A1* 9/2017 Harkins ................. G01D 13/02
2023/0375878 A1* 11/2023 Yang .................... G02B 5/0268

FOREIGN PATENT DOCUMENTS

AU 2009238316 A1 6/2010
CN 205626851 U * 10/2016
CN 206554145 U 10/2017
CN 113638462 A 11/2021
CN 218932936 U * 4/2023
CN 118422615 A * 8/2024
DE 3708460 A * 1/1988 ............. B62M 3/08
JP 2004244857 A 9/2004
JP 6537994 B2 7/2019

* cited by examiner

*Primary Examiner* — Emmanuel M Marcelo

(57) ABSTRACT

In some implementations, a counterweight assembly, for a lifting machine, includes a plurality of counterweight slabs, including first and second outer counterweight slabs and one or more inner counterweight slabs sandwiched between inner lateral surfaces of the first and second outer counterweight slabs, wherein an outer lateral surface of each outer counterweight slab includes one or more recesses having one or more respective reflective decals disposed therein.

20 Claims, 3 Drawing Sheets

HIGHLY VISIBLE COUNTERWEIGHTS FOR LIFTING MACHINES

TECHNICAL FIELD

The present disclosure relates generally to counterweights and, for example, to highly visible counterweights for lifting machines, such as pipelayers.

BACKGROUND

A pipelayer is a machine that is used for installing large, heavy pipeline segments into the earth and/or above ground. During operation, the pipelayer machine extends the weight of the segment laterally away from the chassis, engine, and undercarriage of the pipelayer machine (e.g., with the weight being cantilevered out over surrounding terrain). Depending on the weight of the segment being lifted and the length of the boom, the pipelayer machine may be subject to potential tipping and instability. Counterweights, which are positioned on an opposite side of the pipelayer machine from the boom, counteract the weight of the segment being lifted to increase lifting capacity and resist tipping. The counterweights may extend some distance (e.g., ½ a machine width or more) away from the pipelayer machine.

Generally, because work sites associated with pipelayer machines can be hazardous (e.g., being poorly illuminated and/or subject to inclement weather), operators of other machines in the immediate vicinity need to be careful not to collide with the counterweights. Painted on striping patterns, which are typical in the industry, are not adequate to make the counterweights readily visible. In addition, application of the painted on striping patterns is time-consuming and costly. The painted on striping patterns are also prone to wear (e.g., from collision damage and/or rough handling of the counterweights off-machine). The painted on striping patterns also require reapplication, which is inefficient.

The apparatus of the present disclosure solves one or more of the problems set forth above and/or other problems in the art.

SUMMARY

In some implementations, a counterweight assembly, for a lifting machine, comprises: a plurality of counterweight slabs, including: first and second outer counterweight slabs; and one or more inner counterweight slabs sandwiched between inner lateral surfaces of the first and second outer counterweight slabs, wherein an outer lateral surface of each outer counterweight slab includes one or more recesses having one or more respective reflective decals disposed therein.

In some implementations, a counterweight slab, for a lifting machine, has a body comprising: a first lateral surface; a second lateral surface facing away from the first lateral surface; and a side surface extending around a perimeter of the body, wherein the side surface connects together the first lateral surface and the second lateral surface, and wherein the first lateral surface includes one or more recesses having one or more respective reflective decals disposed therein.

In some implementations, a method of manufacturing a counterweight slab, for a lifting machine, comprises: cutting, with a plasma torch, a profile of the counterweight slab from a larger steel slab, wherein the profile corresponds to a shape of a lateral surface of the counterweight slab; machining, with a machine tool, one or more recesses into the lateral surface of the counterweight slab; and applying one or more respective reflective decals to the one or more recesses.

DETAILED DESCRIPTION

This disclosure relates to counterweights, which are applicable to any lifting machine. The term "lifting machine" may refer to any machine that performs a lifting operation associated with an industry such as, for example, mining, construction, farming, transportation, or another industry. For example, the lifting machine may be a pipelayer machine, an earthmoving machine (e.g., a track-type tractor or wheel loader), and/or other machines.

Figure 1:
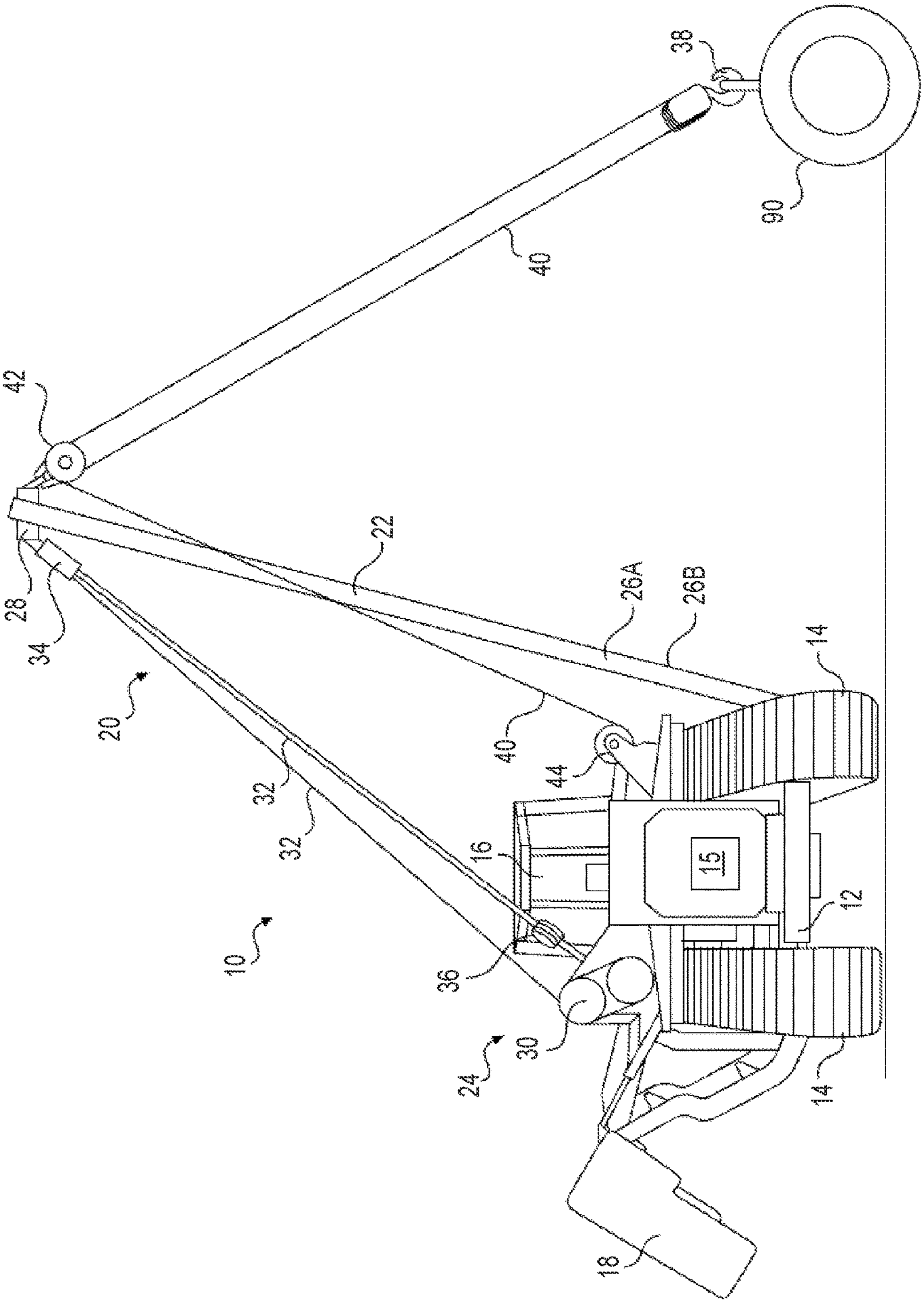
FIG. 1 is a diagram of an example lifting machine described herein.

FIG. 1 is a diagram an example lifting machine described herein. For example, FIG. 1 depicts a front view of a mobile pipelayer machine 10. As shown in FIG. 1, the pipelayer machine 10 includes a chassis 12, a pair of drive tracks 14 engaged with a ground surface, a power source 15 (e.g., an internal combustion engine), an operator cab 16, a counterweight 18 (e.g., a movable counterweight assembly) mounted on the chassis 12, and a crane assembly 20 mounted on the chassis 12 opposite the counterweight 18. The pipelayer machine 10 defines a longitudinal axis, oriented into the plane of the page, from a front end (facing towards the viewer) to a rear end (facing away from the viewer).

The crane assembly 20 includes a boom 22 and a winch system 24 configured to drive lifting operations of the pipelayer machine 10. The boom 22 includes a pair of legs (e.g., front leg 26A and rear leg 26B) that, at a proximal end, may be spaced apart and independently hinged to the chassis 12. The legs 26A-B extend away from the chassis 12 and are joined together at boom tip 28. The winch system 24 includes a winch 30 and a first set of lifting cables 32 extending from the winch 30. The first lifting cables 32 are coupled to a series of pulleys, or sheaves (e.g., first pulley 34 and second pulley 36), to raise and lower the boom 22.

The winch system 24 includes a terminating connector (e.g., grapple hook 38) to couple the crane assembly 20 to the object (e.g., pipe 90) being lifted. The winch system 24 includes a second set of lifting cables 40 extending from the winch 30. The second lifting cables 40 are coupled to a series of pulleys, or sheaves (e.g., third pulley 42 and fourth pulley 44), to raise and lower the grapple hook 38.

As indicated above, FIG. 1 is provided as an example. Other examples may differ from what was described in connection with FIG. 1. For example, aspects of the present disclosure may be embodied within, in addition to mobile pipelayer machines, any lifting machine having a crane assembly 20.

Figure 2A:
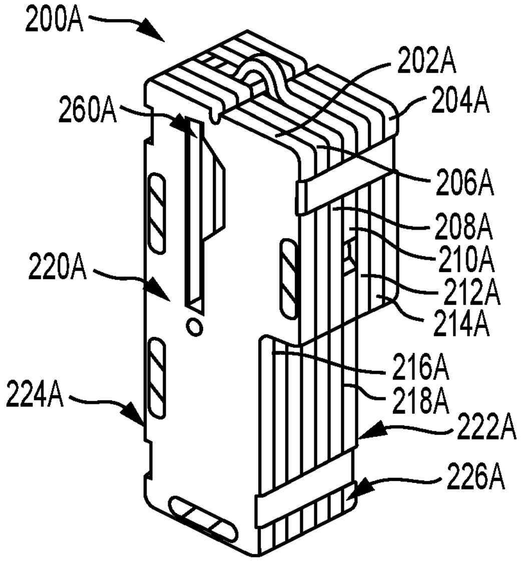
FIG. 2A is a diagram of a perspective view of an example first counterweight assembly described herein.
Figure 2B:
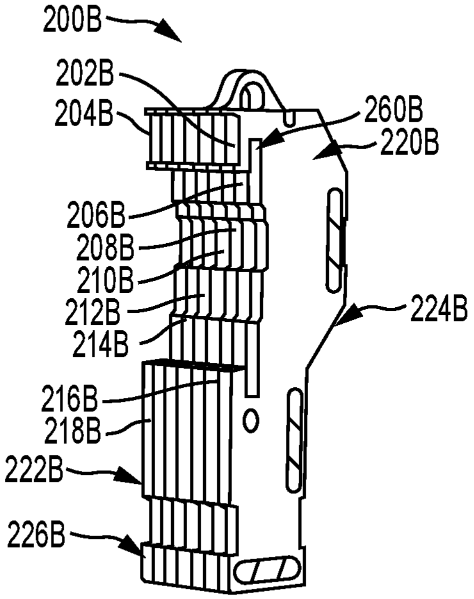
FIG. 2B is a diagram of a perspective view of an example second counterweight assembly described herein.

FIG. 2A is a diagram of a perspective view of an example first counterweight assembly 200A described herein. FIG. 2B is a diagram of a perspective view of an example second counterweight assembly 200B described herein.

Each counterweight assembly 200A/B includes a plurality of counterweight slabs, or plates. The individual counterweight slabs, of each counterweight assembly 200A/B, may be assembled together (e.g., welded or bolted) into a unitized block. Each counterweight assembly 200A/B includes a first outer counterweight slab (e.g., front slab 202A/B) and a second outer counterweight slab (e.g., rear slab 204A/B). Each counterweight assembly 200A/B further includes one or more inner counterweight slabs (e.g., 5 inner slabs, such as inner slabs 206A/B, 208A/B, 210A/B, 212A/B, 214A/B). The inner counterweight slabs are sandwiched between an inner lateral surface, or face, 216A/B of the front slab 202A/B and an inner lateral surface, or face, 218A/B of the rear slab 204A/B. Each counterweight assembly 200A/B includes a mounting structure 260A/B configured to engage a corresponding structure on the pipelayer machine 10. Each counterweight assembly 200A/B may be mounted on the pipelayer machine 10 with the front slab 202A/B nearest the front end, the rear slab 204A/B nearest the rear end, and the inner slabs 206A/B, 208A/B, 210A/B, 212A/B, 214A/B stacked, along the longitudinal axis of the pipelayer machine 10, from the front end to the rear end.

An outer lateral surface, or face, 220A/B of the front slab 202A/B includes one or more recesses, or pockets, having one or more respective reflective decals disposed therein (described in more detail below). The outer lateral surface 220A/B may be a front surface configured to face a forward direction of the pipelayer machine 10. Likewise, an outer lateral surface, or face, 222A/B of the rear slab 204A/B (see FIGS. 3B and 4B) includes one or more recesses having one or more respective reflective decals disposed therein (described in more detail below). The outer lateral surface 222A/B may be a rear surface configured to face a reverse direction of the pipelayer machine 10.

As indicated above, FIGS. 2A-B are provided as examples. Other examples may differ from what was described in connection with FIGS. 2A-B.

Figure 3A:
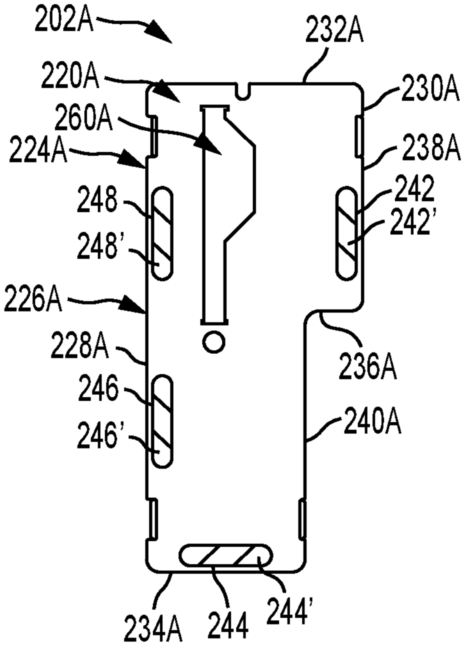
FIG. 3A is a diagram of a front view of an example front counterweight slab, of the first counterweight assembly, described herein.
Figure 3B:
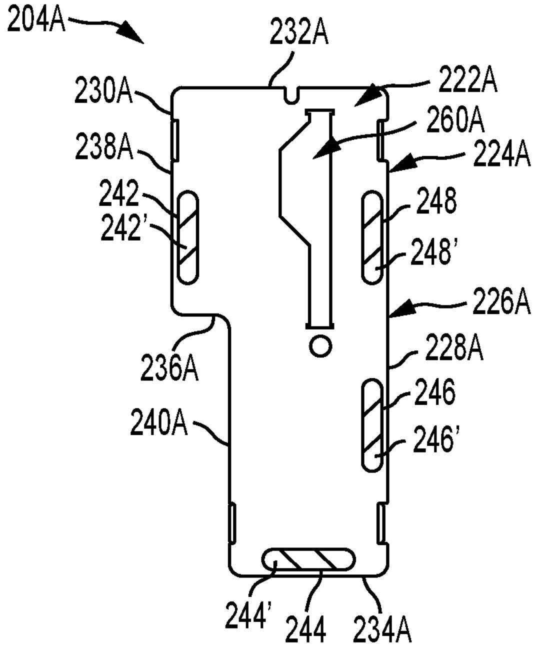
FIG. 3B is a diagram of a back view of an example rear counterweight slab, of the first counterweight assembly, described herein.
Figure 4A:
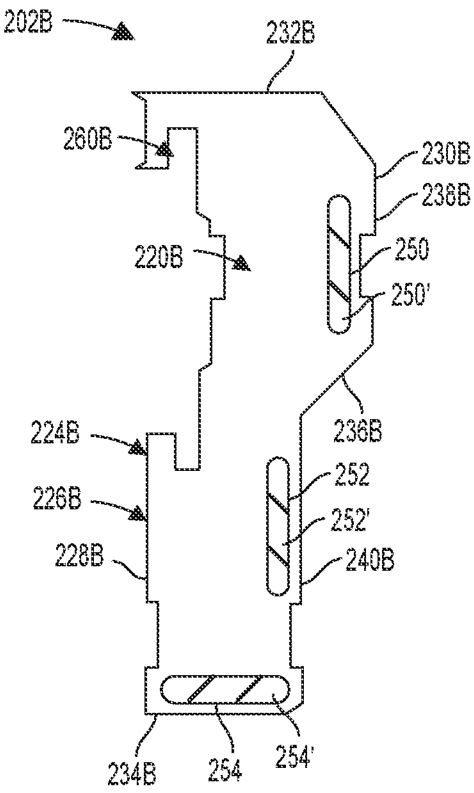
FIG. 4A is a diagram of a front view of an example front counterweight slab, of the second counterweight assembly, described herein.
Figure 4B:
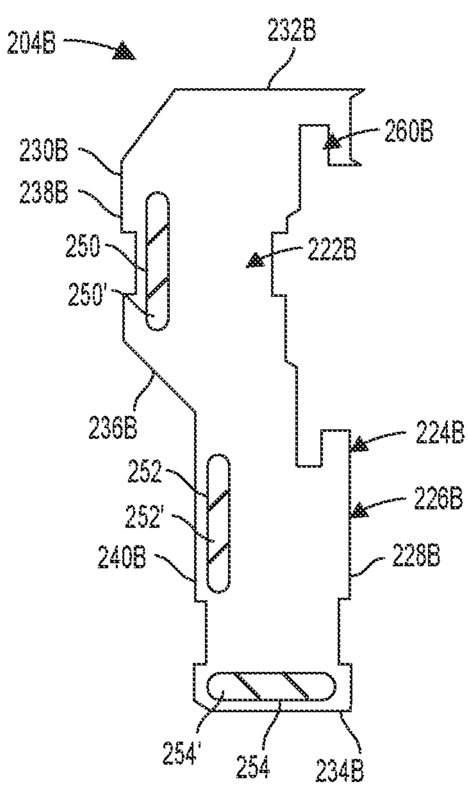
FIG. 4B is a diagram of a back view of an example rear counterweight slab, of the second counterweight assembly, described herein.

FIG. 3A is a diagram of a front view of an example front counterweight slab 202A, of the first counterweight assembly 200A, described herein. FIG. 3B is a diagram of a back view of an example rear counterweight slab 204A, of the first counterweight assembly 200A, described herein. FIG. 4A is a diagram of a front view of an example front counterweight slab 202B, of the second counterweight assembly 200B, described herein. FIG. 4B is a diagram of a back view of an example rear counterweight slab 204B, of the second counterweight assembly 200B, described herein.

As shown in FIGS. 3A-B, the outer lateral surface 220A of the front slab 202A and the outer lateral surface 222A of the rear slab 204A are mirror images of each other. Likewise, as shown in FIGS. 4A-B, the outer lateral surface 220B of the front slab 202B and the outer lateral surface 222B of the rear slab 204B are mirror images of each other.

Referring, collectively, to FIGS. 3A-B and 4A-B, a body 224A/B of the front slab 202A/B and rear slab 204A/B may be L-shaped (e.g., an inverted L-shape). The body 224A/B includes a first lateral surface (e.g., outer lateral surface 220A/B, 222A/B), a second lateral surface (e.g., inner lateral surface 216A/B, 218A/B) facing away from the first lateral surface (e.g., oriented into the plane of the page in FIGS. 3A-B and 4A-B), and a side surface 226A/B (see FIGS. 2A-B) extending around a perimeter of the body 224A/B. The side surface 226A/B connects together the first lateral surface and the second lateral surface.

Referring, collectively, to FIGS. 3A-B and 4A-B, each respective outer lateral surface 220A/B, 222A/B includes an outside edge 228A/B, an inside edge 230A/B, a top edge 232A/B, and a bottom edge 234A/B. The outside edge 228A/B may be a greater distance away from the pipelayer machine 10 compared to the inside edge 230A/B. The inside edge 230A/B has a step 236A/B defining an upper portion 238A/B and a lower portion 240A/B. The upper portion 238A/B may be wider than the lower portion 240A/B. The upper portion 238A/B may be a greater distance away from a ground surface compared to the lower portion 240A/B. The top edge 232A/B connects the outside edge 228A/B and the upper portion 238A/B. The bottom edge 234A/B connects the outside edge 228A/B and the lower portion 240A/B.

Referring to FIGS. 3A-B, the step 236A is perpendicular to the upper portion 238A and the lower portion 240A of the inside edge 230A. The one or more recesses may include first recess 242, second recess 244, third recess 246, and fourth recess 248. The first recess 242 is defined along the upper portion 238A of the inside edge 230A. The second recess 244 is defined along the bottom edge 234A. The third recess 246 and the fourth recess 248 are defined along the outside edge 228A. The one or more recesses may have one or more respective reflective decals disposed therein. For example, the one or more recesses 242, 244, 246, 248 may have corresponding reflective decals 242', 244', 246', 248' disposed therein.

Referring to FIGS. 4A-B, the step 236B is oblique to the upper portion 238B and the lower portion 240B of the inside edge 230B. The one or more recesses may include first recess 250, second recess 252, and third recess 254. The first recess 250 is defined along the upper portion 238B of the inside edge 230B. The second recess 252 is defined along the lower portion 240B of the inside edge 230B. The third recess 254 is defined along the bottom edge 234B. The one or more recesses may have one or more respective reflective decals disposed therein. For example, the one or more recesses 250, 252, 254 may have corresponding reflective decals 250', 252', 254' disposed therein.

Referring, collectively, to FIGS. 3A-B and 4A-B, the one or more recesses 242-254 may have a uniform depth, below the respective outer lateral surface 220A/B, 222A/B, of about 3 mm or greater. Notably, a milling depth of 3 mm, with tolerance of +–0.5 mm, corresponds to a minimum recess depth that prevents damage to the corresponding reflective decal 242'-254' disposed therein after taking account of paint film thickness and reflective decal thickness. The one or more recesses 242-254 may be stadium shaped (which also may be referred to herein as "pill shaped"). The one or more recesses 242-254 may extend lengthwise (e.g., along a longitudinal axis of the stadium shape) parallel to a corresponding edge 228A/B, 230A/B, 232A/B, 234A/B of the respective outer lateral surface 220A/B, 222A/B. The one or more recesses 242-254 may be spaced apart from a corresponding edge 228A/B, 230A/B, 232A/B, 234A/B of the respective outer lateral surface 220A/B, 222A/B by about 10 mm or greater, such as about 20 mm or greater, such as within a range of about 20 mm to about 30 mm (e.g., about 25 mm). Notably, a spacing of 10 mm corresponds to a minimum spacing to prevent break out of a mill cutter due to expected deviations in the profile of the corresponding edge 228A/B, 230A/B, 232A/B, 234A/B of the outer lateral surface 220A/B, 222A/B. An edge of the one or more reflective decals 242'-254' may be spaced apart from a corresponding edge of the one or more recesses 242-254. Notably, the larger size of the one or more recesses 242-254 compared to the respective reflective decals 242'-254' makes applying the reflective decals faster and easier.

The reflective decals 242'-254' may include any type of reflective material that may be known and/or used in an industry. The reflective decals 242'-254' may include a wide variety of patterns and colors (e.g., alternating colors, such as white with red lines, red with white lines, white lines and red lines, half red block/half white block, among other examples).

As indicated above, FIGS. 3A-B and 4A-B are provided as examples. Other examples may differ from what was described in connection with FIGS. 3A-B and 4A-B.

Figure 5:
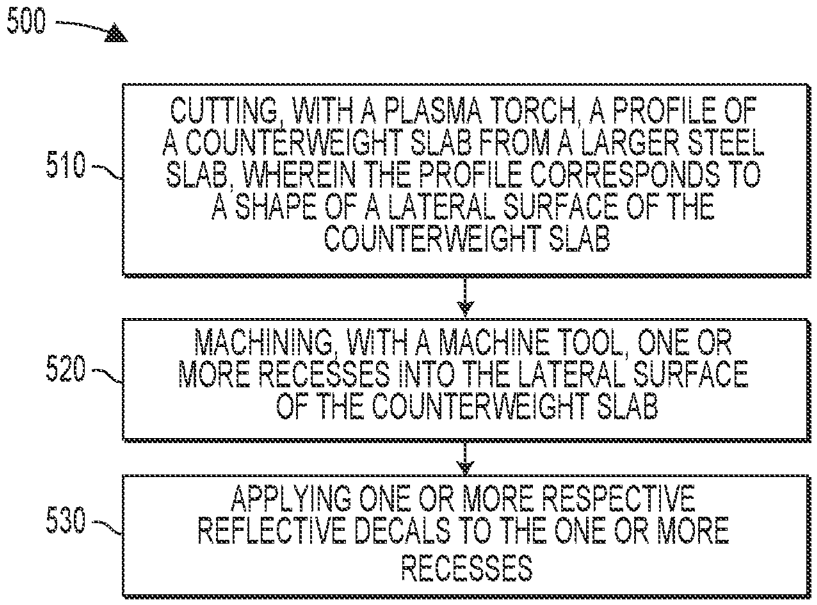
FIG. 5 is a flow diagram of an example method of manufacturing a counterweight slab described herein.

FIG. 5 is a flow diagram of an example method 500 of manufacturing a counterweight slab described herein (e.g., front slab 202A/B and rear slab 204A/B). At 510, the method 500 includes cutting, with a plasma torch (which also may be referred to herein as "plate burning"), a profile of the counterweight slab from a larger steel slab. The profile may correspond to a shape of a lateral surface (e.g., outer lateral surface 220A/B, 222A/B) of the counterweight slab. At 520, the method 500 includes machining, with a machine tool, one or more recesses 242-254 into the lateral surface of the counterweight slab. In some examples, only one lateral surface of the counterweight slab is machined, in order to conserve time and expense. The machine tool may be a milling machine. Respective dimensions of the one or more recesses 242-254 may correspond to a cutter of the milling machine. At 530, the method 500 includes applying one or more respective reflective decals 242'-254' to the one or more recesses 242-254. Notably, applying the reflective decals 242'-254' within the corresponding matching recesses 242-254 improves consistency and speed of the reflective decal placement since no guides are needed for positioning.

As indicated above, FIG. 5 is provided as an example. Other examples may differ from what was described in connection with FIG. 5.

INDUSTRIAL APPLICABILITY

Counterweights may be associated with lifting machines, such as pipelayer machines, to counteract the weight of an object being lifted in order to increase lifting capacity and resist tipping. For example, during operation, a pipelayer machine may extend the weight of a pipeline segment laterally away from the chassis, engine, and undercarriage of the pipelayer machine (e.g., with the weight being cantilevered out over surrounding terrain). Depending on the weight of the segment being lifted and the length of the boom, the counterweight may be movable to change a center of gravity of the pipelayer machine to further resist potential tipping and instability.

Generally, because work sites associated with pipelayer machines can be hazardous (e.g., being poorly illuminated and/or subject to inclement weather), operators of other machines in the immediate vicinity need to be careful not to collide with the counterweights, especially when the counterweights are moved to an extended position (see FIG. 1).

Painted on striping patterns, which are typical in the industry, are not adequate to make the counterweights readily visible. In addition, application of the painted on striping patterns is time-consuming and costly. The painted on striping patterns are also prone to wear (e.g., from collision damage and/or rough handling of the counterweights off-machine). The painted on striping patterns also require reapplication, which is inefficient.

Reflective decals associated with the example counterweight assemblies described herein are faster, cheaper, and easier to apply, resistant to wear, and offer improved visibility compared to painted on stripes. In addition, reapplication of the reflective decals is more efficient than repainting. The size and shape of the reflective decals outlines the shape of the counterweight assembly while reducing cost compared to covering the entire surface area.

The arrangement of the reflective decals especially improves the visibility of certain features of the counterweight geometry/profile. For example, when a counterweight assembly 200A/B is extended (see FIG. 1), a vehicle driving beside the pipelayer machine 10 may be at risk of colliding with a low point (e.g., a corner between the bottom edge 234A/B and the outside edge 228A/B) of the counterweight assembly 200A/B, which may be elevated about chest high. A reflective decal 244'/254' positioned along the bottom edge 234A/B enhances the visibility of the low point. As a result, a likelihood of collision with the counterweight assembly 200A/B may be reduced. Furthermore, as the counterweight assembly 200A/B is returned from the extended position, a potential crush point (e.g., between the inside edge 230A/B of the counterweight assembly 200A/B and the pipelayer machine 10) may result. A reflective decal 242'/250' positioned along the inside edge 230A/B enhances the visibility of the crush point. As a result, a risk associated with the crush point may be reduced.

The foregoing disclosure provides illustration and description, but is not intended to be exhaustive or to limit the implementations to the precise forms disclosed. Modifications and variations may be made in light of the above disclosure or may be acquired from practice of the implementations. Furthermore, any of the implementations described herein may be combined unless the foregoing disclosure expressly provides a reason that one or more implementations cannot be combined. Even though particular combinations of features are recited in the claims and/or disclosed in the specification, these combinations are not intended to limit the disclosure of various implementations. Although each dependent claim listed below may directly depend on only one claim, the disclosure of various implementations includes each dependent claim in combination with every other claim in the claim set.

As used herein, "a," "an," and a "set" are intended to include one or more items, and may be used interchangeably with "one or more." Further, as used herein, the article "the" is intended to include one or more items referenced in connection with the article "the" and may be used interchangeably with "the one or more." Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of"). Further, spatially relative terms, such as "below," "lower," "above," "upper," and the like, may be used herein for ease of description to describe one element or feature's relationship to another element(s) or feature(s) as illustrated in the figures. The spatially relative terms are intended to encompass different orientations of the apparatus, device, and/or element in use or operation in addition to the orientation depicted in the figures. The apparatus may be otherwise oriented (rotated 90 degrees or at other orientations) and the spatially relative descriptors used herein may likewise be interpreted accordingly.

What is claimed is:

1. A counterweight assembly, for a lifting machine, comprising:
- a plurality of counterweight slabs, including:
  - first and second outer counterweight slabs; and
  - one or more inner counterweight slabs sandwiched between inner lateral surfaces of the first and second outer counterweight slabs,
    - wherein an outer lateral surface of each outer counterweight slab includes one or more recesses having one or more respective reflective decals disposed therein.

2. The counterweight assembly of claim 1, wherein the outer lateral surface of each outer counterweight slab includes:
- an outside edge;
- an inside edge having a step defining an upper portion and a lower portion;
- a top edge connecting the outside edge and the upper portion; and
- a bottom edge connecting the outside edge and the lower portion,
  - wherein the one or more recesses include:
    - a first recess defined along the upper portion of the inside edge;
    - a second recess defined along the bottom edge; and
    - third and fourth recesses defined along the outside edge.

3. The counterweight assembly of claim 1, wherein the outer lateral surface of each outer counterweight slab includes:
- an outside edge;
- an inside edge having a step defining an upper portion and a lower portion;
- a top edge connecting the outside edge and the upper portion; and
- a bottom edge connecting the outside edge and the lower portion,
  - wherein the one or more recesses include:
    - a first recess defined along the upper portion of the inside edge;
    - a second recess defined along the lower portion of the inside edge; and
    - a third recess defined along the bottom edge.

4. The counterweight assembly of claim 1, wherein the outer lateral surface is a front surface configured to face a forward direction of the lifting machine.

5. The counterweight assembly of claim 1, wherein the outer lateral surface is a rear surface configured to face a reverse direction of the lifting machine.

6. The counterweight assembly of claim 1, wherein the one or more recesses have a uniform depth of about 3 mm or greater.

7. The counterweight assembly of claim 1, wherein the one or more recesses extend lengthwise parallel to a corresponding edge of the outer lateral surface.

8. The counterweight assembly of claim 1, wherein the one or more recesses are spaced apart from a corresponding edge of the outer lateral surface.

9. The counterweight assembly of claim 1, wherein an edge of the one or more reflective decals is spaced apart from a corresponding edge of the one or more recesses.

10. The counterweight assembly of claim 1, wherein the one or more recesses are stadium shaped.

11. A counterweight slab, for a lifting machine, having a body comprising:
- a first lateral surface;
- a second lateral surface facing away from the first lateral surface; and
- a side surface extending around a perimeter of the body,
  - wherein the side surface connects together the first lateral surface and the second lateral surface, and
  - wherein the first lateral surface includes one or more recesses having one or more respective reflective decals disposed therein.

12. The counterweight slab of claim 11, wherein the one or more recesses have a uniform depth of about 3 mm or greater.

13. The counterweight slab of claim 11, wherein the one or more recesses extend lengthwise parallel to a corresponding edge of the first lateral surface.

14. The counterweight slab of claim 11, wherein the one or more recesses are spaced apart from a corresponding edge of the first lateral surface.

15. The counterweight slab of claim 11, wherein an edge of the one or more reflective decals is spaced apart from a corresponding edge of the one or more recesses.

16. The counterweight slab of claim 11, wherein the first lateral surface is a front surface configured to face a forward direction of the lifting machine, and
- wherein the second lateral surface is a rear surface configured to face a reverse direction of the lifting machine.

17. The counterweight slab of claim 11, wherein the first lateral surface is a rear surface configured to face a reverse direction of the lifting machine, and
- wherein the second lateral surface is a front surface configured to face a forward direction of the lifting machine.

18. The counterweight slab of claim 11, wherein the one or more recesses are stadium shaped.

19. A method of manufacturing a counterweight slab, for a lifting machine, comprising:
- cutting, with a plasma torch, a profile of the counterweight slab from a larger steel slab,
  - wherein the profile corresponds to a shape of a lateral surface of the counterweight slab;
- machining, with a machine tool, one or more recesses into the lateral surface of the counterweight slab; and
- applying one or more respective reflective decals to the one or more recesses.

20. The method of claim 19, wherein the machine tool is a milling machine, wherein the one or more recesses are stadium shaped, and wherein respective dimensions of the one or more recesses correspond to a cutter of the milling machine.

* * * * *